(12) United States Patent
Bushida et al.

(10) Patent No.: US 7,006,538 B2
(45) Date of Patent: Feb. 28, 2006

(54) APPARATUS FOR LOCKING BENDING MECHANISM THAT BENDS REFLEX TYPE WAVELENGTH SELECTION ELEMENT

(75) Inventors: Satoru Bushida, Oyama (JP); Tatsuya Ariga, Oyama (JP); Toru Igarashi, Oyama (JP)

(73) Assignee: Komatsu Ltd., Tokyo (JP)

( * ) Notice: Subject to any disclaimer, the term of this patent is extended or adjusted under 35 U.S.C. 154(b) by 173 days.

(21) Appl. No.: 09/484,424

(22) Filed: Jan. 18, 2000

(65) Prior Publication Data

US 2003/0072347 A1    Apr. 17, 2003

(30) Foreign Application Priority Data

Jan. 19, 1999   (JP)  .................................. 11-010652

(51) Int. Cl.
*H01S 3/121*   (2006.01)
*H01S 3/10*    (2006.01)
*H01S 3/08*    (2006.01)

(52) U.S. Cl. ........................... 372/14; 372/20; 372/99; 372/102; 372/107

(58) Field of Classification Search ................. 372/92, 372/99, 20, 107, 98, 102, 101, 33, 109, 14, 372/29.022; 359/224, 229
See application file for complete search history.

(56) References Cited

U.S. PATENT DOCUMENTS

| | | | | |
|---|---|---|---|---|
| 3,579,839 A | * | 5/1971 | Kowalski | 33/265 |
| 4,022,523 A | * | 5/1977 | Lindonen et al. | 359/849 |
| 5,095,492 A | * | 3/1992 | Sandstrom | 372/102 |
| 5,283,797 A | * | 2/1994 | Mefferd | 372/24 |
| 5,970,082 A | * | 10/1999 | Ershov | 372/102 |
| 6,212,217 B1 | * | 4/2001 | Erie et al. | 372/102 |

* cited by examiner

*Primary Examiner*—Minsun Harvey
*Assistant Examiner*—Armando Rodriguez
(74) *Attorney, Agent, or Firm*—Posz Law Group, PLC

(57) ABSTRACT

A an apparatus for locking a bending mechanism that bends a reflex type wavelength selection element for a bending mechanism that bends a reflex type wavelength selection element comprises a locking assembly. The locking assembly locks the bending mechanism. This allows maintaining the configuration of the reflex type wavelength selection element with the element being bent by the bending mechanism according to curvature of wavefront of an incident laser beam. Therefore, it is possible to stabilize the performance of wavelength selection in the reflex type wavelength selection element, even though the laser device receives vibration and shock.

6 Claims, 5 Drawing Sheets

APPARATUS FOR LOCKING BENDING MECHANISM THAT BENDS REFLEX TYPE WAVELENGTH SELECTION ELEMENT

BACKGROUND OF THE INVENTION

1. Field of the Invention

This invention relates to an apparatus for locking a bending mechanism that bends a reflex type wavelength selection element constituting a part of an optical resonator to correct wavefronts in laser beams outputted from the reflex type wavelength selection element.

2. Description of the Related Art

Excimer lasers are employed as light sources in steppers for use in semiconductor device manufacture.

FIG. 6 is a diagram schematically illustrating a whole configuration of an optical resonator 13 used in an excimer laser.

As shown in FIG. 6, a laser chamber 14 of the optical resonator 13 has discharge electrodes 15 which are made up of an anode and a cathode arranged opposite to each other in the direction perpendicular to the paper surface of the drawing. The laser chamber 14 contains laser gas composed of halogen gas, rare gas, buffer gas, etc., which is excited by discharge between the discharge electrodes 15 to generate laser oscillation.

The laser chamber 14 has two laser output ports which are provided with windows 16. Also, slits 19 for restricting the width of the laser beam are provided between the laser chamber 14 and a front mirror 17 and between the laser chamber 14 and a band-narrowing module 18.

The band-narrowing module 18, in this case, comprises a beam expander 20 and a grating 1 serving as an angle dispersing type wavelength selection element. The beam expander 20 is composed of one or more prisms not shown and expands the beam width of the incident laser beam to output it to the grating 1.

That is, in FIG. 6, the optical resonator is configured between the front mirror 17 and the grating 1.

In the construction shown in FIG. 6, a laser beam generated in the laser chamber 14 comes into the band-narrowing module 18 wherein the beam expander 20 expands its beam width. Further, the expanded laser beam L comes into the grating 1 to be diffracted, whereby only a predetermined wavelength component of the laser beam comes out of the grating 1 and is returned in the same direction as the incident laser beam. The laser beam returned by the grating 1, after having its width reduced by the beam expander 20, comes into the laser chamber 14. Namely, the grating 1 serves as a reflex type wavelength selection element that reflects a laser beam and selects a wavelength.

The laser beam amplified through passing inside the laser chamber 14 comes into the front mirror 17, whereby a part thereof is extracted as the output beam and the remainder is again returned into the laser chamber 14 and amplified.

Due to various causes, the laser beam wavefront comes to have divergence (expansion) and curvature inside the optical resonator.

For example, in case that the slit 19 is arranged in the optical resonator 13 as described above, the light having passed through the slit 19 becomes a spherical wave due to the diffraction produced at the slit 19.

Further, the aberration of optical elements arranged in the optical resonator 13 might cause the wavefront to be distorted. For example, a transmission type optical element such as the prism expander 20 used as a band-narrowing element has such properties as follows, (a) the internal refractive index distribution is not perfectly uniform, and
(b) the polished surfaces of the prism are distorted.

Due to these properties, the wavefront of the laser beam having passed through the above-mentioned type optical element comes to have either convex or concave curvature.

When the laser beam L whose wavefront has such curvature comes into the flat grating 1, the wavelength selectivity of the grating 1 lowers. Specifically, when the incident wavefront of the laser beam L on the grating has curvature, the laser beam L comes into respective grooves of the grating 1 at different angles, whereby the wavelength selectivity of the grating 1 lowers.

In a conventional art, the above-mentioned problems have been coped with by bending the grating 1 itself according to the curvature of the incident wavefront on the grating so as to coincide with the wavefront of the laser beam coming into the grating.

FIGS. 7A and 7B show the conventional art mentioned above.

As shown in FIGS. 7A and 7B, the grating 1 is provided with supporting members 9 for supporting its both end portions, a holding member 21 for holding its center portion, and a bending mechanism (pushing member 2, spring 3) for moving the center portion of the grating 1 in the pushing and pulling directions through the hold member 21. The bending mechanism can bend the grating 1 in any degree (or can correct the degree of bend).

More particularly, as shown in FIG. 7A, when the wavefront is concave viewed from the traveling direction of the incident laser beam L, the center portion of the grating 1 is moved in the incident direction X1 via the holding member 21, whereby the incident surface of the grating 1 becomes convex. On the other hand, as shown in FIG. 7B, when the wavefront is convex viewed from the traveling direction of the incident laser beam L, the center portion of the grating 1 is moved in the converse direction X2 to the incident direction via the holding member 21, whereby the incident surface of the grating 1 becomes concave.

As the pushing mechanism, a micrometer was used so that the grating 1 precisely is bent in nanometer level.

In such conventional art, since the grating 1 is bent with high precision at nanometer level of measurement, even a very small displacement in bending is not allowed. Accordingly, once laser devices are produced at a factory and the grating has been bent and adjusted, it is necessary not to permit any displacement of the bend from an adjusted position.

However, the configuration of the grating may easily be changed by vibrations and shocks generated during the transportation of the laser devices.

For this reason, there is a problem that the configuration of the grating that has been bent by using a micrometer with high precision cannot be maintained.

Thus, the configuration of the grating does not correspond to the curvature of the incident wavefront on the grating, so that the wavelength selection performance lowers.

SUMMARY OF THE INVENTION

In view of the foregoing, an object of the present invention is to stabilize the wavelength selection performance in a reflex type wavelength selection element.

To achieve this object, according to the present invention, there is provided an apparatus for locking a bending mechanism that bends a reflecting surface of a reflex type wavelength selection element constituting a part of a optical resonator according to curvature of wavefront of an incident laser beam, characterized in that locking means for locking the bending mechanism is provided.

According to the present invention, as shown in FIG. 1, locking means 8 locks a bending mechanism 2. Accordingly, the configuration of the reflex type wavelength selection element 1 that has been bent by the bending mechanism 2 corresponding to the curvature of the wavefront of an incident laser beam L is maintained. Therefore, after the shipment of the laser devices from a factory, it is possible to prevent the adjusted position of the bent configuration of the grating 1 from being displaced.

Accordingly, it is possible to stabilize the performance of wavelength selection in the reflex type wavelength selection element 1, even though the laser device receives vibration and shock.

BRIEF DESCRIPTION OF THE DRAWINGS

The above and other objects and features of the present invention will be seen by reference to the description taken in connection with the accompanying drawings in which.

DESCRIPTION OF THE PREFERRED EMBODIMENTS

Hereinafter, preferred embodiments of an apparatus for locking a bending mechanism that bends a reflex type wavelength selection element will be described with reference to the accompanying drawings.

Figure 1:
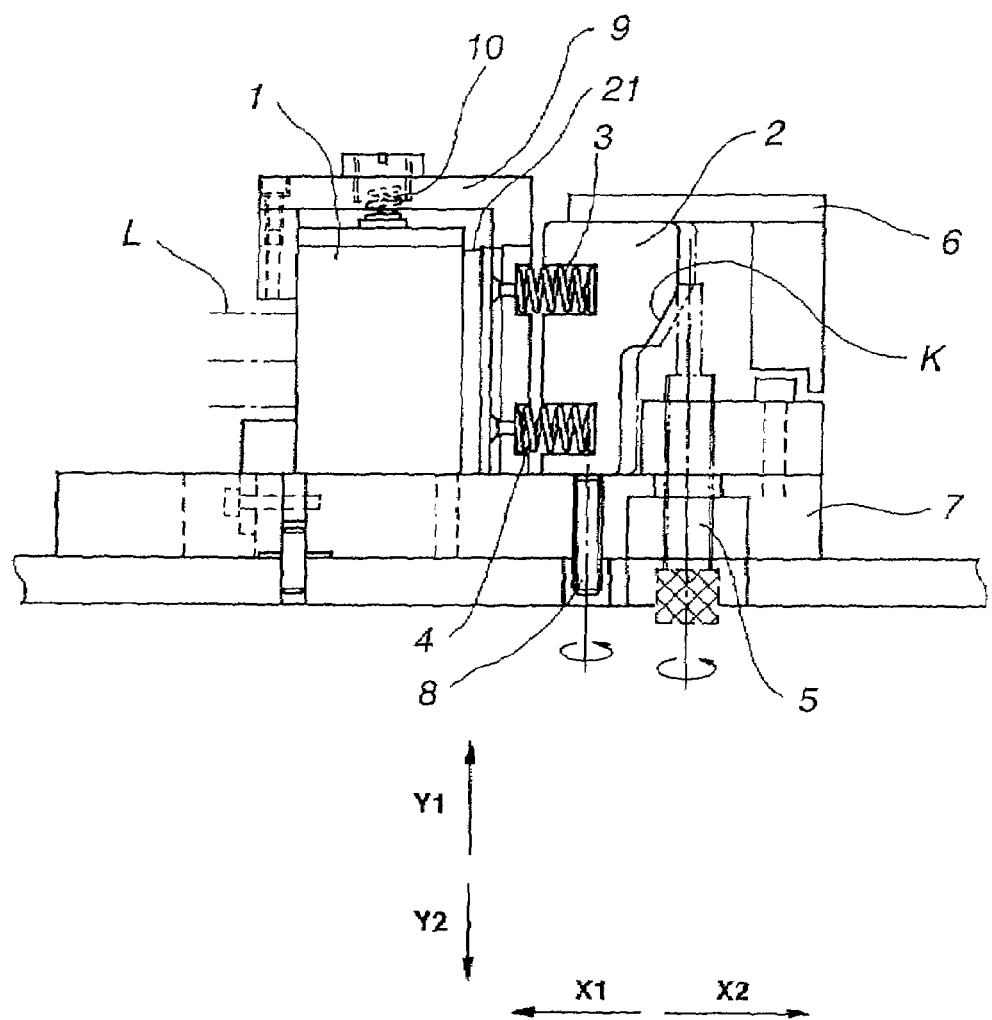
FIG. 1 is a diagram schematically illustrating a first embodiment of an apparatus for locking a bending mechanism that bends a reflex type wavelength selection element of the present invention.
Figure 6:
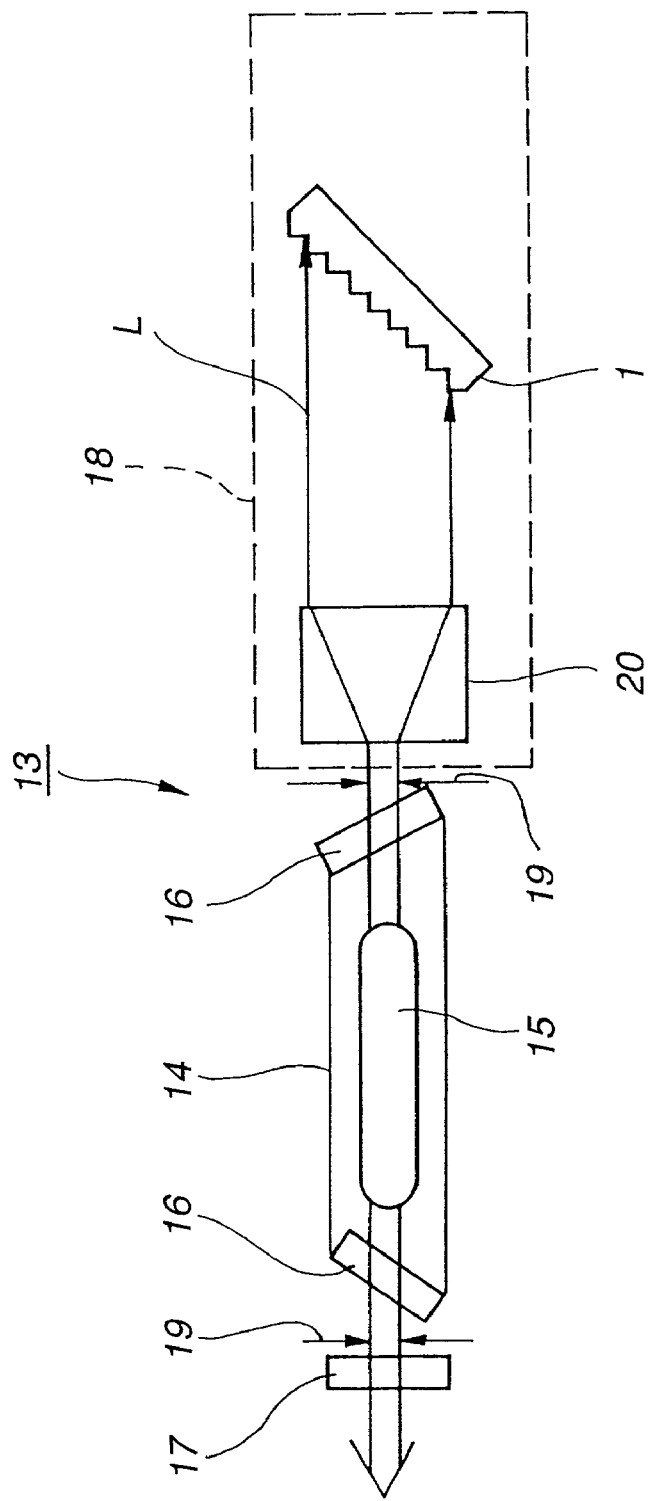
FIG. 6 is a diagram schematically illustrating the constitution of the optical resonator of the laser device wherein the embodiment of the apparatus is built.

FIG. 1 shows a first embodiment of an apparatus for locking a bending mechanism that bends a reflex type wavelength selection element. Besides, in FIG. 1, constitutional elements that are identical with corresponding elements in FIGS. 6 and 7 described above are given the same reference numbers and therefore, the explanation about those constitutional elements is omitted.

FIG. 1 shows a side view in section of the apparatus according to the embodiment.

Figure 7A:
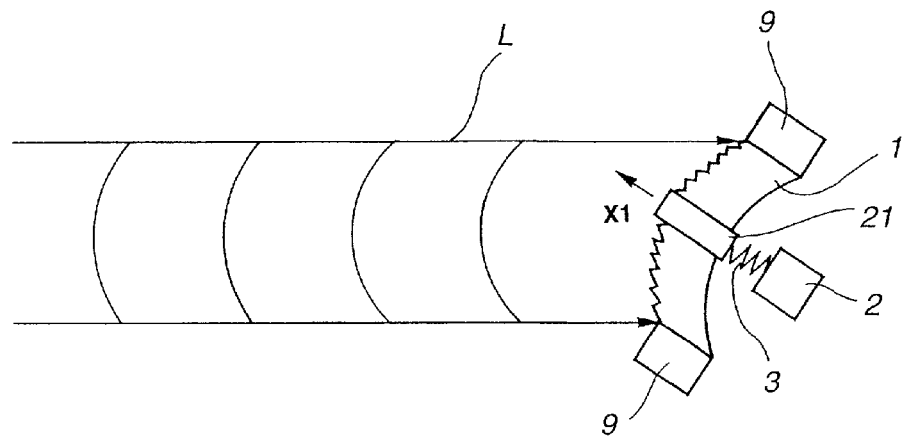
FIGS. 7A and 7B are diagrams schematically illustrating the reflecting surfaces of the gratings that are bent according to curvatures of wavefronts of laser beams.
Figure 7B:
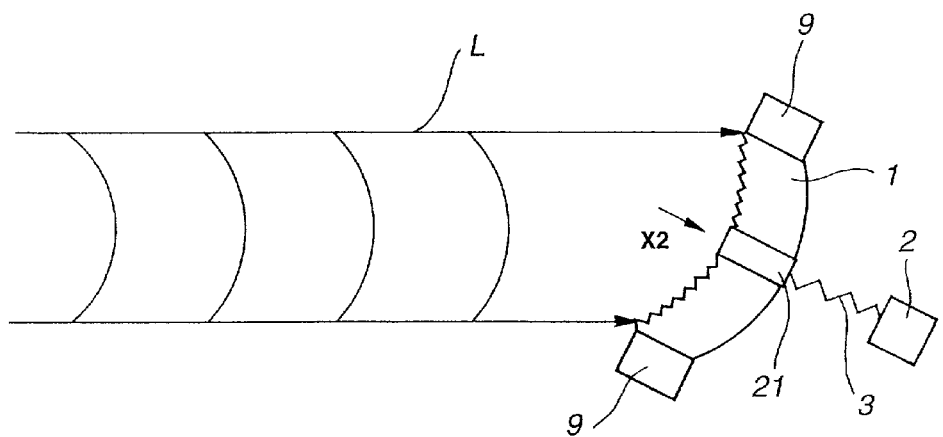

A grating 1 is a reflex type wavelength selection element constituting one side of the optical resonator 13. The reflecting surface of the grating 1 where the laser beam L comes into is so constructed that it can be bent by pushing and pulling according to the curvature of the wavefront of the laser beam L. That is, as shown in FIGS. 7A and 7B, a grating-supporting member 9 supports both end portions of the grating 1. A holding member 21 holds the center portion of the grating 1. The grating-supporting member 9 pushes the top end of the grating 1 through a grating-supporting spring 10, thereby fixing the grating 1 to a lower supporting member 7.

The bending mechanism that bends the grating 1 is constructed as follows:

The bending mechanism comprises a pushing member 2 which moves the center of the grating 1 in the pushing and pulling directions via the holding member 21, springs 3 and 4, and adjusting bolt 5.

More specifically, the bending mechanism 2, 3, 4, 5 comprises the springs 3 and 4 that are connected to the holding member 21 at one ends and connected to the pushing member 2 at the other ends, the adjusting bolt 5 that is screwed into the lower supporting member 7 in such a way that the head of the bolt faces downward and the top of the bolt contacts the slant portion K of the pushing member 2, and the pushing member 2 that slides in the direction X1, X2 bending the reflecting surface of the grating 1 by changing of the position where the top end of the bolt 5 contacts the slant portion K, according to direct-moving of the adjusting bolt 5 in the direction of arrows Y1, Y2.

Figure 3:
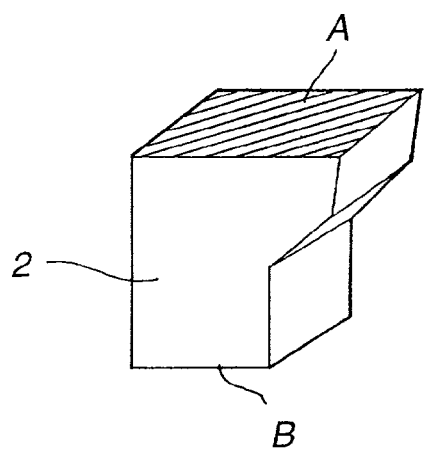
FIG. 3 is a perspective view of the pushing member shown in FIG. 1.

The pushing member 2 slides between an upper supporting member 6 and the lower supporting member 7. FIG. 3 shows a perspective view of the pushing member 2. The surfaces A, B where the pushing member 2 is in contact with the upper supporting member 6 and the lower supporting member 7 are finished surfaces with small coefficient of friction.

The adjusting bolt 5 is screwed into the lower supporting member 7 in such a way that the head of the bolt is adjustable by turning from lower side.

In this embodiment, a locking screw 8 is screwed into the lower supporting member 7. The locking screw 8 locks the pushing member 2 located between the upper supporting member 6 and the lower supporting member 7. The locking screw 8 is screwed in such a way that the head of the screw 8 is adjustable by turning from lower side and the top of the screw 8 contacts the lower surface of the pushing member 2.

Hereinafter, the operation of the embodiment is explained.

First of all, the reflecting surface of the grating 1 is bent by the bending mechanism 2, 3, 4, 5.

Specifically, as shown in FIG. 7A, it is supposed that the wavefront of the laser beam L is concave, when viewed from the traveling direction of the incident laser beam L. In this case, the head of the adjusting bolt 5 is turned in the clockwise direction, whereby the adjusting bolt 5 directly moves upward in the direction Y1 in FIG. 1. Thereupon, the contacting position between the top portion of the adjusting bolt 5 and the slant portion K of the pushing member 2 moves upward, whereby the pushing member 2 slides in the left direction X1 in FIG. 1. As a result, the center of the grating 1 moves in the incident direction X1 namely pushing direction through the holding member 21, so that the incident surface of the grating 1 is configured so as to be convex. After that, when the pushing member 2 slides to the position where corresponds to the curvature of the wavefront of the laser beam L that goes into the reflecting surface of the grating 1, the adjustment of the adjusting bolt 5 is completed.

On the other hand, as shown in FIG. 7B, it is supposed that the wavefront of the laser beam L is convex, with viewed from the traveling direction of the incident laser beam L. In this case, the head of the adjusting bolt 5 is turned in the counterclockwise direction, whereby the adjusting bolt 5 directly moves downward in the direction Y2 in FIG. 1. Thereupon, the contacting position between the top portion of the adjusting bolt 5 and the slant portion K of the pushing member 2 moves downward, whereby the pushing member 2 slides in the right direction X2 in FIG. 1. As a result, the center of the grating 1 is moved in the opposite direction X2 to the incident direction by spring force of the springs 3, 4 through the holding member 21, so that the incident surface of the grating 1 is configured so as to be concave. After that, when the pushing member 2 slides to the position where corresponds to the curvature of the wavefront of the laser beam L that goes into the reflecting surface of the grating 1, the adjustment of the adjusting bolt 5 is completed.

As described above, after the adjustment by the adjusting bolt 5 is completed, the head of the locking screw 8 is screwed. This allows the top portion of the locking screw 8 to be in contact with the lower surface of the pushing member 2 to lock the pushing member 2.

As described above, according to the embodiment, since the pushing member 2 is locked, it is possible to maintain the configuration of the grating 1 that was bent by the pushing member 2 according to the curvature of the wavefront of incident laser beam L. For that reason, after the shipment of the laser devices from a factory, it is possible to prevent the adjusted position of the bent configuration of the grating 1 from being displaced. Accordingly, it is possible to stabilize the performance of wavelength selection in the grating 1 even though the laser device receives vibration and shock. Besides, in this embodiment, the locking of the pushing member 2 with the screw 8 maintains the adjusted configuration of the grating 1. However, the locking of the adjusting bolt 5 by locknut and the like may maintain the adjusted configuration of the grating 1. Also, without screws, locknuts and the like, bonding and the like may fix the pushing member 2.

Besides, after the adjustment of the adjusting bolt 5 is completed and the locking screw 8 locks the pushing member 2, the adjusting bolt 5 may be removed.

Figure 2:
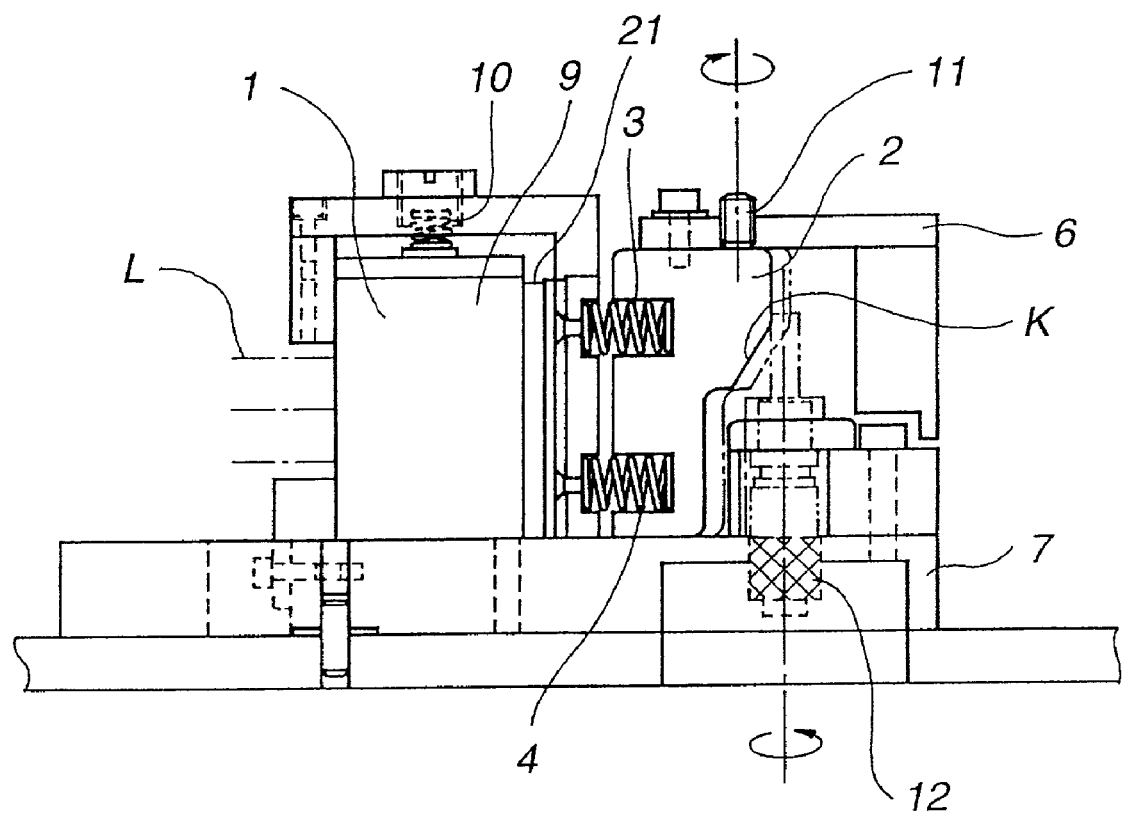
FIG. 2 is a diagram schematically illustrating a second embodiment of an apparatus for locking a bending mechanism that bends a reflex type wavelength selection element of the present invention.

FIG. 2 shows an alternative embodiment relative to that shown in FIG. 1. Besides, in FIG. 2, constitutional elements that are identical with corresponding elements in FIG. 1 described above are given the same reference numbers and therefore, the explanation about those constitutional elements is omitted.

In the apparatus of the embodiment shown in FIG. 2, a micrometer 12 is used in place of the adjusting bolt 5 in FIG. 1. Specifically, the micrometer 12 is mounted to the lower supporting member 7 in such a way that its operating portion faces downward and its top contacts the slant portion K of the pushing member 2. Accordingly, the micrometer 12 is adjustable by turning from lower side.

Further, a locking screw 11 which locks the pushing member 2 from upper side is used in place of the locking screw 8 which locks the pushing member 2 from lower side shown in FIG. 1. That is, the locking screw 11 is screwed into the upper supporting member 6 so as to lock the pushing member 2 between the upper supporting member 6 and the lower supporting member 7. The locking screw 11 is screwed in such a way that the head of screw is adjustable by turning from upper side and the top of screw contacts the upper surface of the pushing member 2.

Consequently, in the embodiment shown in FIG. 2, the pushing member 2 slides by turning of the micrometer 12, whereby the reflecting surface of the grating 1 is bent so as to become a configuration according to the curvature of the laser beam L.

Further, after the adjustment of the micrometer 12 is completed, the pushing member 2 is locked by the locking screw 11. Accordingly, in the embodiment shown in FIG. 2, like the embodiment shown in FIG. 1, it is possible to stabilize the performance of wavelength selection in the grating 1 even though the laser device receives vibration and shock.

Figure 4:
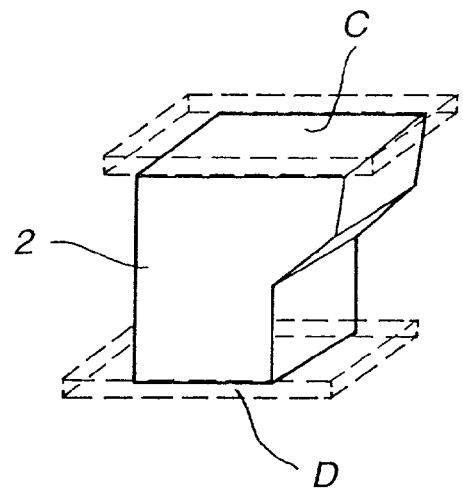
FIG. 4 is a diagram illustrating a modification to the embodiment shown in FIGS. 1 and 2.

Besides, in the embodiments described above, screws 8, 11 lock the pushing member 2. However, as shown in FIG. 4, plate members C and D may be employed to lock the pushing member 2 from the upper side, lower side, or both sides.

Figure 5:
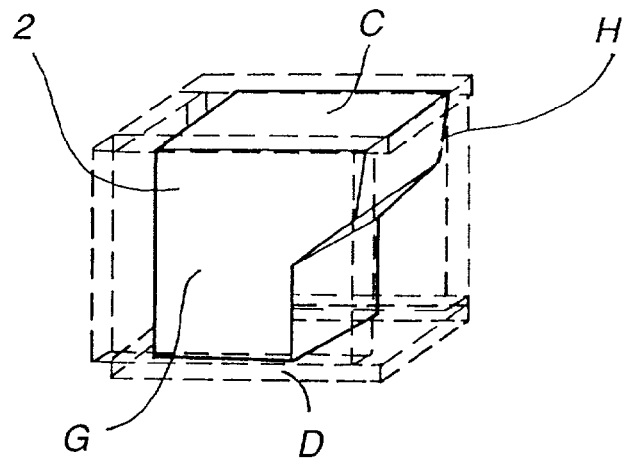
FIG. 5 is a diagram illustrating a modification to the embodiment shown in FIGS. 1 and 2.

Also, as shown in FIG. 5, plate members G and H may be employed to lock the pushing member 2 from one lateral side, the other lateral side, or both lateral sides. Further, all surfaces including the upper and lower sides and the both lateral sides on the pushing member 2 may be locked.

It is further understood by those skilled in the art that the foregoing description is a preferred embodiment of the present invention and that various changes and modifications may be made in the present invention without departing from the spirit and scope thereof.

What is claimed is:

1. An optical resonator including an apparatus for locking a bending mechanism that bends a reflex type wavelength selection element constituting a part of the optical resonator according to curvature of wavefront of an incident laser beam, which comprises locking means for locking the bending mechanism at any adjusted position so as to hold a curvature of the wavelength selection element constant against a mechanical shock applied to the optical resonator and making adjustment of the curvature of the wavelength selection element impossible when the bending mechanism is locked by the locking means, wherein the locking means and the bending mechanism are separate structures.

2. An optical resonator including an apparatus for locking a bending mechanism that bends a reflex type wavelength selection element constituting a part of an optical resonator according to curvature of wavefront of an incident laser beam, which comprises adjustment means for varying a position of a grating that modifies the curvature of wave front of an incident laser beam to any adjusted position of the curvature of wavefront, and locking means for locking the adjustment means in the adjusted position so as to hold a curvature of the wavelength selection element constant against a mechanical shock applied to the optical resonator and preventing adjustment of the curvature of the wavelength selection element by the adjustment means when locked by the locking means.

3. An optical resonator as set forth in claim 1, wherein the locking means includes a locking screw.

4. An optical resonator as set forth in claim 2, wherein the locking means includes a locking screw.

5. An optical resonator as set forth in claim 1, wherein the adjusted position can be adjusted at a nanometer level of measurement.

6. An optical resonator as set forth in claim 2, wherein the adjusted position can be adjusted at a nanometer level of measurement.

* * * * *